UNITED STATES PATENT OFFICE.

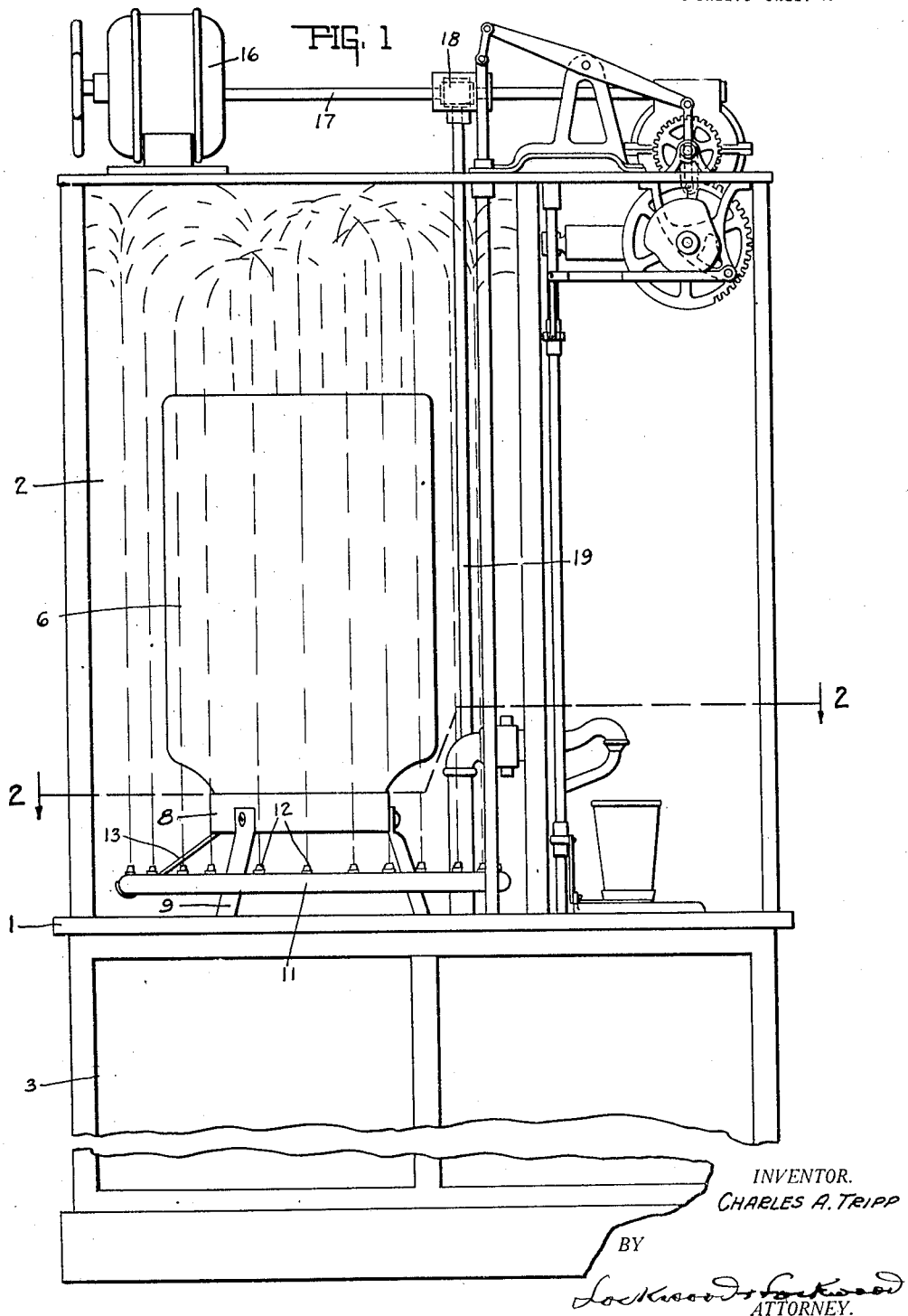

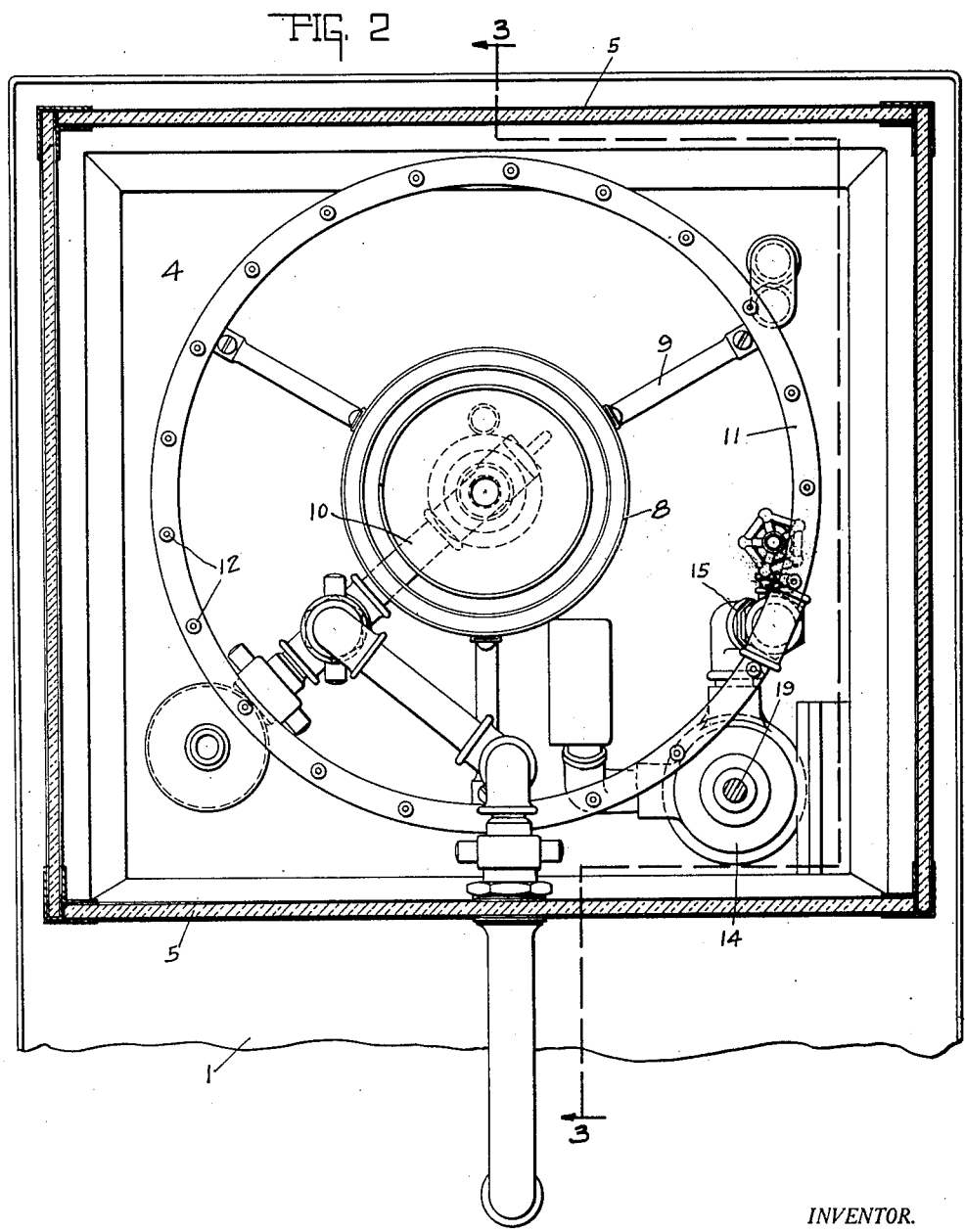

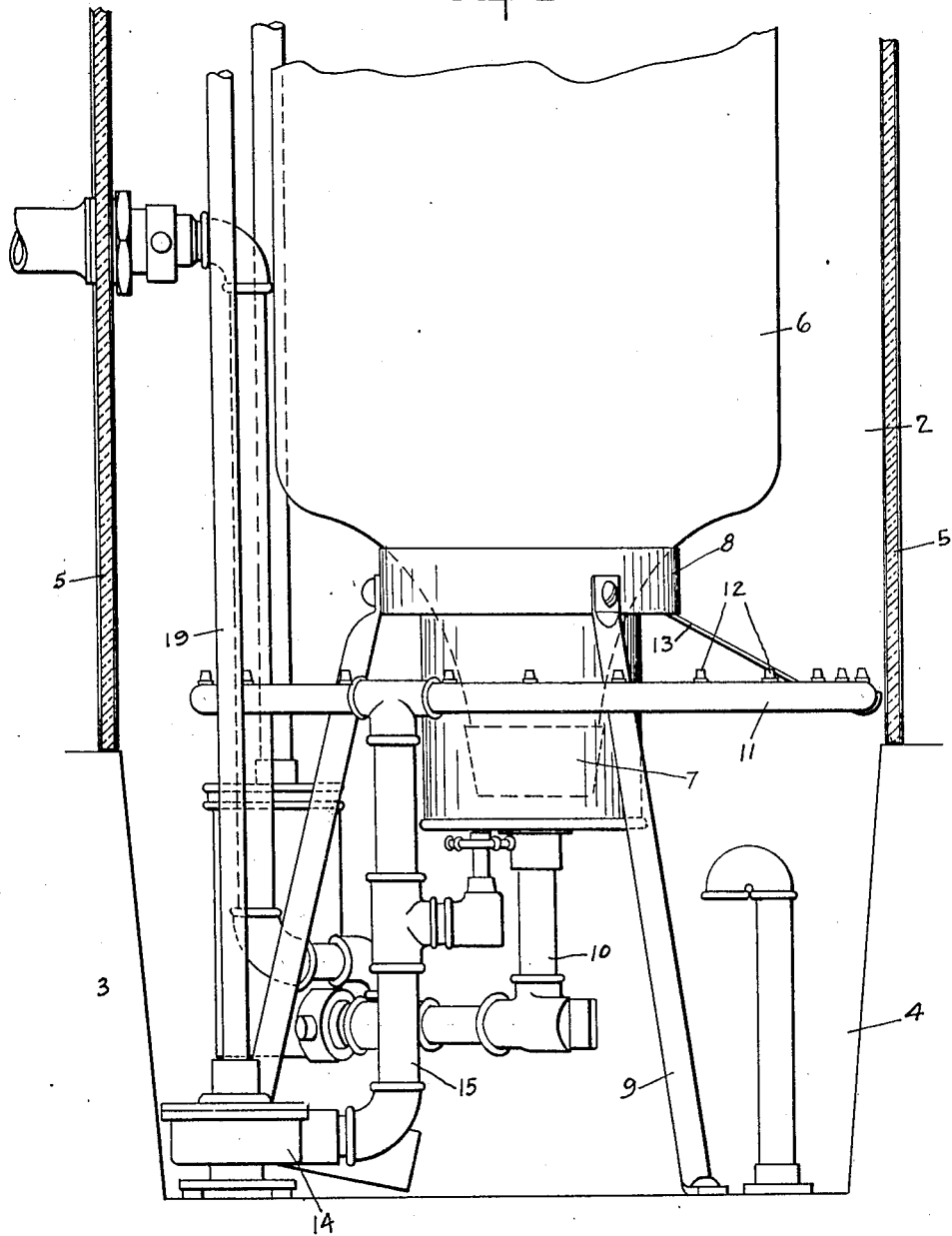

CHARLES A. TRIPP, OF WILMINGTON, DELAWARE, ASSIGNOR TO HOLCOMB AND HOKE M'F'G CO., OF INDIANAPOLIS, INDIANA, A CORPORATION.

COOLING MEANS FOR LIQUID-DISPENSING DEVICES.

1,336,172.    Specification of Letters Patent.    Patented Apr. 6, 1920.

Original application filed October 22, 1917, Serial No. 197,854. Divided and this application filed January 24, 1919. Serial No. 272,926.

*To all whom it may concern:*

Be it known that I, CHARLES A. TRIPP, a citizen of the United States, and a resident of Wilmington, county of New Castle, and State of Delaware, have invented a certain new and useful Cooling Means for Liquid-Dispensing Devices; and I do hereby declare that the following is a full, clear, and exact description thereof, reference being had to the accompanying drawings, in which like numerals refer to like parts.

This invention relates to cooling means for liquid dispensing devices, and is a division of my co-pending application Serial No. 197,854, filed October 22, 1917. The prime feature of the invention is the provision of means for causing streams of water to fall over and around a receptacle containing a liquid to be dispensed, such as butter milk and the like.

A further feature of the invention is the provision of a cabinet having a cavity in the lower portion thereof, in which is placed ice for cooling the water which is thrown over the liquid containing receptacle.

A further feature of the invention is the provision of visual panels in the upper portion of the cabinet, forming the walls of that portion of the cabinet immediately surrounding the receptacle containing the liquid.

A further feature of the invention is the provision of means for causing the water to spray over the receptacle containing the liquid and on to the top and side walls of the cabinet.

A further feature of the invention is the provision of means for forcing the water from the lower portion of the cabinet, through the spraying means, with sufficient force to carry the water to the highest part of the cabinet.

Other objects and advantages will be hereinafter more fully set forth and pointed out in the accompanying specification.

Referring to the drawings, which are made a part of this application, Figure 1 is a side elevation of the liquid dispensing cabinet, with parts broken out. Fig. 2 is a sectional view thereof as seen on line 2—2 of Fig. 1. Fig. 3 is a detail sectional view as seen on line 3—3 of Fig. 2.

Referring to the drawings, in which similar reference numerals designate corresponding parts throughout the several views, 1 indicates a cabinet which may be constructed in any preferred manner, and having an upper and lower compartment 2 and 3 respectively, the lower compartment 3 having a tank 4 therein for the reception of ice or other cooling medium. The walls 5 of the upper compartment 2 are preferably constructed of glass or other suitable transparent substance, so that a view may be had of the upper portion of the cabinet, and in this compartment is placed the liquid container 6, preferably in the shape of a bottle, said container, when placed within the compartment 2, being inverted so that the neck 7 thereof will enter a sealing cup 8, which cup is supported by standards 9 extending upwardly from the floor of the tank.

The liquid is removed from the sealing cup and container through a pipe 10 which connects with the bottom of the sealing cup and projects downwardly into the tank 4, and as the tank contains ice and water the liquid passing through the pipe will be maintained in a thoroughly cooled condition until such time as it is discharged from the pipe.

The container 6 is positioned above the tank 4 and does not come in contact with the ice and water within the tank. The liquid within the container is first cooled by spraying jets of ice water continuously over the container and also over the walls of the compartment 2, this being accomplished by positioning a spraying ring 11 concentrically around the sealing cup 8, the diameter of which is greater than the diameter of the container. The upper face of the spraying ring 11 has a plurality of nozzles 12 which cause the water to leave the spraying ring in fine streams or jets, said jets spreading out in mushroom fashion as they reach the top of the compartment 2 causing parts of the water to fall on to the container and parts on the walls 5 of the upper compartment. The ring 11 is held in position in any suitable manner, as by means of brackets 13, which are attached at their inner upper ends to the sealing cup 8. In order to thoroughly cool the contents of the container 6, the water thrown thereover is taken from the tank 4, the water being forced through the nozzles 12 by a centrifugal pump 14 located within the tank 4 adjacent the bottom thereof, and being connected with the spraying ring 11 by a pipe 15. The pump 14 is operated in any suitable manner, but in this instance by a motor 16, which is preferably mounted on the cabinet 1, power being transmitted from the motor through a shaft 17 and a worm gear construction 18 to a pump operating shaft 19, although as previously stated any preferred means may be used for operating the centrifugal pump. The motor 16 is continuously running and consequently the pump 14 is continuously operated and thus continuously throwing the jets of water over the container and the walls of the cabinet, and as the water is thoroughly cooled by the ice within the tank the contents of the container and the interior of the upper compartment 2 will be thoroughly chilled and maintained in this condition while the liquid dispenser is in use.

By this manner of spraying ice water over the liquid container the liquid is always maintained in a thoroughly cooled condition, and the expense of operating the device is not increased, as no additional ice is required for cooling purposes and the motor is continuously operating also, so that no additional expense is incurred in this respect. In addition to cooling the liquid within the container the jets of water create a fountain effect and as the walls of the upper portion of the cabinet are transparent, more or less attention is attracted to the cabinet, which under other conditions, would not occur.

The invention claimed is:

1. A cooling means for liquid dispensing devices, including a liquid container, a tank adapted to contain a cooling medium, a spraying ring surrounding said container and connected with said tank, and means to discharge jets of cooling medium from said ring over said container.

2. A cooling means for liquid dispensing devices, including a liquid container, a tank adapted to contain a cooling medium, means to support the container above said tank, a spraying ring surrounding said container, nozzles on said spraying ring, and means to force the cooling medium through said nozzles and discharge same in jets over said container.

3. A cooling means for liquid dispensing devices, including a cabinet having an upper and lower compartment, a tank for containing a cooling medium in the lower compartment, a liquid container in the upper compartment, a sealing cup supporting said container, and means to spray jets of the cooling medium from the tank over said container and the walls of the upper compartment.

4. A cooling means for liquid dispensing devices, including a cabinet having an upper and lower compartment, a tank in the lower compartment for containing a cooling medium, a liquid container in the upper compartment, and means to spray jets of the cooling medium over the surface of said liquid container and the walls of the upper compartment.

5. A cooling means for liquid dispensing devices, including a liquid container, a tank for containing a cooling medium, a spraying ring surrounding the lower portion of said liquid container, a plurality of nozzles on the ring for spraying jets of the cooling medium over said container, and a pump in said tank for forcing the cooling medium through said nozzles and over said container.

6. A cooling means for liquid dispensing devices, including a liquid container, a tank containing a cooling medium, spraying means surrounding said liquid container for spraying jets of the cooling medium over the container, and means for forcing the cooling means through said spraying means and over said container.

7. A cooling means for liquid dispensing devices, including a cabinet having an upper and lower compartment, a tank in the lower compartment for containing a cooling medium, a liquid container in the upper compartment, means surrounding said container for spraying jets of the cooling medium over said container, and means for forcing the cooling medium through said spraying means.

8. A cooling means for liquid dispensing devices, including a cabinet having an upper and lower compartment, a tank in the lower compartment for containing a cooling medium, a liquid container in the upper compartment, and a spraying ring surrounding the lower portion of said liquid container having a plurality of openings therein for spraying jets of the cooling medium upon the top of said upper compartment and over said container.

9. A cooling means for liquid dispensing devices including a liquid container, a tank containing a cooling medium, a spraying means surrounding said liquid container and having a plurality of openings therein for spraying jets of the cooling medium over said container, and a sealing cup supporting said container and spraying means.

In witness whereof I have hereunto affixed my signature.

CHARLES A. TRIPP.